US012654615B2

(12) United States Patent
Pasquarelli

(10) Patent No.: US 12,654,615 B2
(45) Date of Patent: Jun. 16, 2026

(54) VEHICLE WINDOW AND METHOD FOR PRODUCING A VEHICLE WINDOW

(71) Applicant: Webasto SE, Stockdorf (DE)

(72) Inventor: Robert Pasquarelli, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 18/833,509

(22) PCT Filed: Jan. 27, 2023

(86) PCT No.: PCT/EP2023/052012
§ 371 (c)(1),
(2) Date: Jul. 26, 2024

(87) PCT Pub. No.: WO2023/160942
PCT Pub. Date: Aug. 31, 2023

(65) Prior Publication Data
US 2025/0153634 A1 May 15, 2025

(30) Foreign Application Priority Data
Feb. 25, 2022 (DE) ..................... 10 2022 104 600.1

(51) Int. Cl.
*B60Q 3/208* (2017.01)
*B60J 1/00* (2006.01)
(Continued)

(52) U.S. Cl.
CPC .............. *B60Q 3/208* (2017.02); *B60Q 3/64* (2017.02); *B60R 13/0815* (2013.01); *B60J 1/001* (2013.01)

(58) Field of Classification Search
CPC ...................................................... B60Q 3/208
See application file for complete search history.

(56) References Cited

U.S. PATENT DOCUMENTS

| | | | | |
|---|---|---|---|---|
| 12,233,778 B2 * | 2/2025 | de Bie | ................... | B60Q 3/208 |
| 2013/0299856 A1 * | 11/2013 | Verger | .............. | B32B 17/10541 |
| | | | | 438/27 |

(Continued)

FOREIGN PATENT DOCUMENTS

| | | |
|---|---|---|
| CN | 105174737 A | 12/2015 |
| DE | 10 2015 221 185 A1 | 5/2017 |

(Continued)

OTHER PUBLICATIONS

IPRP from PCT/EP2023/052012; mailed Sep. 6, 2024; In English (10 pages).

(Continued)

*Primary Examiner* — Eric T Eide
(74) *Attorney, Agent, or Firm* — Fitch, Even, Tabin & Flannery, LLP

(57) ABSTRACT

A vehicle window includes a window body arrangement, which has an outer face facing a vehicle environment and an inner face facing a vehicle interior and a light-conducting layer, and the vehicle window including a lighting unit having at least one light source and at least one light input element, which is disposed on the inner face of the window body arrangement and by means of which light emitted by the light source can be coupled into the light-conducting layer. A thermal coating is disposed on the inner face of the window body arrangement, the thermal coating including a thermally insulating material.

15 Claims, 2 Drawing Sheets

Figure 1:
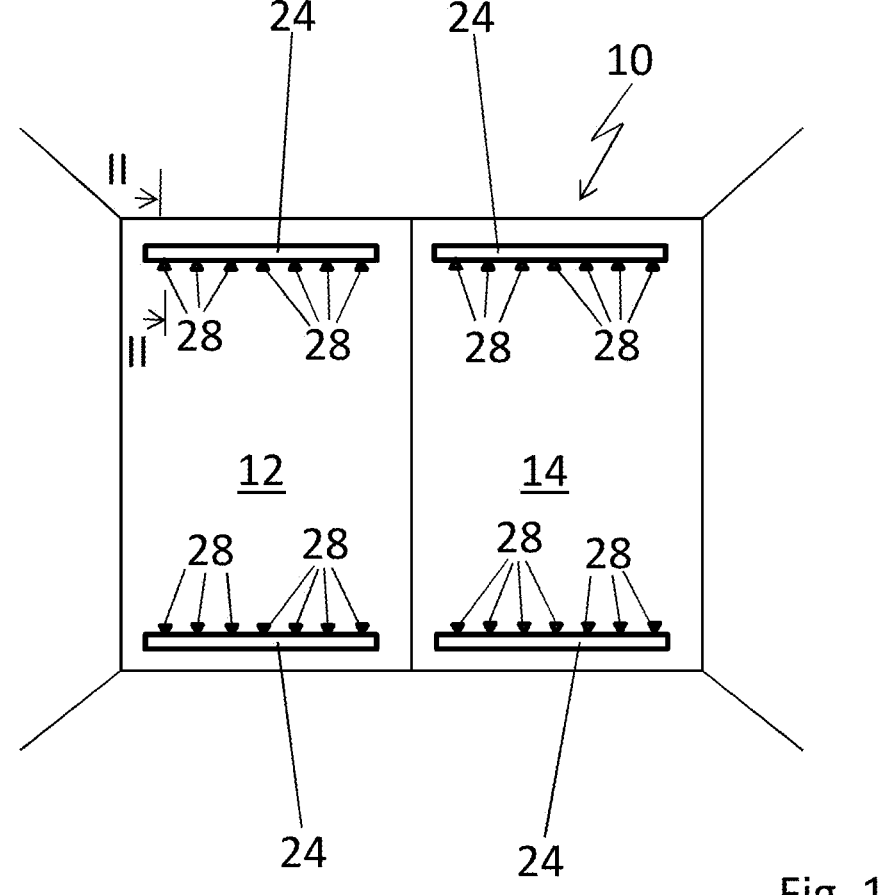

(51) Int. Cl.
 B60Q 3/64      (2017.01)
 B60R 13/08      (2006.01)

(56)         References Cited

U.S. PATENT DOCUMENTS

| | | | |
|---|---|---|---|
| 2014/0218934 A1 | 8/2014 | Mueller | |
| 2015/0165728 A1 | 6/2015 | Legrand | |
| 2019/0193376 A1* | 6/2019 | Bauerle | ................ H10H 20/857 |
| 2023/0118480 A1* | 4/2023 | Pasquarelli | ............. B60Q 3/64 |
| | | | 296/215 |
| 2023/0324598 A1 | 10/2023 | Nielsen | |

FOREIGN PATENT DOCUMENTS

| | | | | |
|---|---|---|---|---|
| DE | 102020109338 B3 * | 5/2021 | ........... | G02B 6/0095 |
| WO | 2012/139787 A1 | 10/2012 | | |
| WO | 2013/189798 A1 | 12/2013 | | |
| WO | 2021/198262 A1 | 10/2021 | | |
| WO | 2022/079300 A1 | 4/2022 | | |
| WO | 2022/096365 A1 | 5/2022 | | |

OTHER PUBLICATIONS

Office Action issued against corresponding German Application No. 10 2022 104 600.1; mailed Jul. 28, 2022; In German with English Machine Translation (12 pages).
ISR from PCT/EP2023/052012; mailed Apr. 18, 2024; In English (6 pages).
Third Party Observation for EP20230704705; date mailed Feb. 28, 2025; in German with English translation (3 pages).

\* cited by examiner

VEHICLE WINDOW AND METHOD FOR PRODUCING A VEHICLE WINDOW

CROSS-REFERENCE TO RELATED APPLICATIONS

This application is a U.S. national phase application filed under 35 U.S.C. § 371 of International Application No. PCT/EP2023/052012, filed Jan. 27, 2023, designating the United States, which claims priority from German Patent Application Number DE 10 2022 104 600.1, filed Feb. 25, 2022, which are hereby incorporated herein by reference in their entireties for all purposes.

The invention relates to a vehicle window having the features of the preamble of claim 1 and to a method for producing a vehicle window.

A vehicle window of this kind is known from practice and is used in particular in the context of a vehicle roof as a fixed roof element or as a lid element of a roof opening system, by means of which a roof opening can be closed or opened selectively. This vehicle window comprises a window body arrangement, which can be configured as laminated glass and which has a light-conducting layer, which can be formed by an inner window body of the window body arrangement. A lighting unit, whose light can be coupled into the light-conducting layer via a prism-like strip-shaped light input element, is connected to the light-conducting layer. By activating the light source, the light-conducting layer forms an illuminated area visible from the vehicle interior.

The problem with the vehicle window described above is that heat is lost through the window, particularly in cold weather conditions, so that the climatic conditions in the vehicle interior are inadequate, especially in the occupant head area.

The object of the invention is to provide a vehicle window formed according to the make mentioned above, which contributes to improving the temperature conditions in a vehicle interior, and to provide a method for producing such a vehicle window.

According to the invention, this object is attained by the vehicle window having the features of claim 1 and by the method having the features of claim 8.

The invention proposes a vehicle window which comprises a window body arrangement, which has an outer face facing a vehicle environment and an inner face facing a vehicle interior and a light-conducting layer. Provided are a lighting unit having at least one light source and at least one light input element, which is disposed on the inner face of the window body arrangement and by means of which light emitted by the light source can be coupled into the light-conducting layer. To reduce thermal loss via the window body arrangement, a thermal coating, which comprises a thermally insulating material, is disposed on the inner face of the window body arrangement. Thus, in the form of a thermal coating, the inner face of the window body arrangement is provided with a so-called low-E coating, which has good permeability for visible light but low permeability for infrared radiation.

So as to not impair the coupling of the light into the light-conducting layer via the light input element, the thermal coating is recessed at least in parts of the area of the light input element in a preferred embodiment of the vehicle window according to the invention, so that at least parts of the light input element in this area are directly connected to the window body arrangement. The refractive index of the thermal coating, which generally differs from the refractive indexes of the light-conducting layer and the light input element, does not interfere with the light coupling. Otherwise, the different refractive indexes could cause an unintended refraction between the light source and the light-conducting layer, which in turn could cause a decrease of the internal reflection in the light-conducting layer and thus could cause a decreased light intensity. By recessing the thermal coating, it can also be prevented that the thermal coating impairs the connection of the light input element to the light-conducting layer because of the adhesive properties of the thermal coating. Thus, the risk of the light input element detaching from the window body arrangement is reduced.

In a preferred embodiment of the vehicle window according to the invention, the thermal coating comprises a vapor deposit coating or a sputter coating, which can also be applied in particular in a pyrolytic way.

The thermal coating can be a one-layer system or a multi-layer system and comprise in particular one or several films which at least partly comprise the thermally insulating material.

As a thermally insulating material, the thermal coating can comprise so-called nanoparticles and/or nanowires, which have a high absorption capacity in the infrared range but essentially do not impair the passage of visible light through the window body arrangement. Furthermore, it is conceivable that the thermal coating comprises an inorganic metal oxide compound, an ITO (indium tin oxide) compound, an FTO (fluorine doped tin oxide) compound, a graphene-based compound and/or a silver compound or pure silver.

In general, the window body arrangement of the vehicle window according to the invention can be formed by a toughened safety glass or by a laminated shatterproof glass comprising at least two layers of glass or window bodies.

If the invention is used with a laminated shatterproof glass, the window body arrangement comprises an outer window body and an inner window body, which is connected to the outer window body via a connecting layer. In this case, the inner window body preferably forms the light-conducting layer, the light input element being connected to the inner face of the inner window body. In this embodiment, there are no additional costs for applying a separate light-conducting layer. An ambient light function for a large area can be provided by means of the inner window body.

With a laminated shatterproof glass, it is of course also conceivable that an additional light-conducting layer, into which the light of the light source can be coupled by means of the light input element, is applied to the inner window body. Generally, the light-conducting layer can also be formed so as to have several layers.

The inner window body, which can have the same dimensions as the outer window body or which can be smaller, is preferably made of any material usable as a light conductor. For example, the inner window body is made of a material which comprises glass and/or a polycarbonate material and/or any other plastic material.

In another specific embodiment of the vehicle window according to the invention, several light input elements, which are disposed on the inner face of the light conducting layer, are provided in rows next to each other or behind each other. In this case, the lighting unit preferably comprises a corresponding number of light sources or LEDs, meaning at least two light sources. Each light source is assigned to one light input element.

In an embodiment with a strip-shaped or prism-shaped light input element, several LEDs can be distributed over its length as light sources.

Furthermore, an advantageous embodiment of the vehicle window according to the invention has at least one light input element with an assigned lighting unit at edges of the window body arrangement that face away from each other, the input elements being disposed close to the respective edges. Thus, rows of several light input elements disposed next to each other can be disposed on both sides, at least one light source of the respective lighting unit being assigned to one light input element each.

For the light input element to be able to act in the manner of an optical prism and for the light emitted from the light source into the light input element to be optimally coupled into the light-conducting layer, the light input element has a wedge-shaped or trapeze-shaped cross section in a preferred embodiment of the vehicle window according to the invention.

The light input element of the vehicle window according to the invention can be formed as a plastic body, which is in particular made of a material comprising PMMA (polymethyl methacrylate), PC (polycarbonate), PA (polyamide), COC (cyclic olefin copolymer) or COP (cyclic olefin polymer). However, it is also conceivable that the light input element is a glass element.

A specific embodiment of the vehicle window according to the invention is formed as a vehicle roof window, which forms a fixed roof element, which is rigidly disposed relative to a vehicle body, or which forms a displaceable lid element of a roof opening system.

The method according to the invention for producing a vehicle window comprises the following steps:

Providing a window body arrangement, which has an inner face and an outer face and which comprises a light-conducting layer on its inner face;

Applying a thermal coating to the inner face of the window body arrangement, the thermal coating comprising a thermal insulation material;

Applying at least one light input element to the inner face of the window body arrangement, which has a light input surface; and Connecting a lighting unit comprising at least one light source to the window body arrangement and/or the light input element, so that light of the light source can be coupled into the light input element via the light input surface and via said light input element into the light-conducting layer.

In a specific embodiment of the method according to the invention, the thermal coating is at least partly recessed in the areas in which the light input element is connected to the light-conducting layer so as to not impair the coupling behavior of the light into the light-conducting layer. The thermal coating is recessed, for example, during or after application.

For example, the thermal coating is subjected to a chemical material removal process, for example an etching process, in the areas in which the light input element is connected to the inner face of the window body arrangement.

Additionally or alternatively, the thermal coating can be removed in the respective areas, in which the light input element is connected to the light-conducting layer, according to a mechanical process, for example a grinding process and/or polishing process.

It is also conceivable that the thermal coating is removed in the respective areas according to a physical process, for example a laser ablation process.

In an alternative embodiment of the method according to the invention, the light-conducting layer is masked when the thermal coating is applied. This means that the relevant areas of the light-conducting layer remain free and without the thermal coating from the outset.

The masking can be formed from a sacrificial layer and/or a soluble print and/or a water-soluble paste, which is applied to the inner face of the window body arrangement before the thermal coating is applied or deposited and which is removed after the application of the thermal coating.

In a specific embodiment of the method according to the invention, the thermal coating is deposited on the light-conducting layer according to a chemical or physical vapor deposit or sputter process.

It is also conceivable, that the thermal coating is applied as a film or composite film, which can also have a vapor deposit coating or a sputter coating.

The thermal coating can have optical properties which lead to destructive and constructive interference of certain wavelengths. This could lead to color changes compared to the color spectrum emitted by the light source. The thermal coating may also absorb certain wavelengths, which also leads to a change in the color of the illuminated area provided by the light-conducting layer. For this reason, in a specific embodiment of the method according to the invention, color coordinates are entered into the lighting unit depending on the optical behavior of the thermal coating. This allows the luminous color of the light-conducting layer to be adjusted to the desired color. If the light source is configured as an LED, their so-called RGB values can be set. Thus, a color correction is made at the light source depending on the thermal coating.

Further advantages and advantageous embodiments of the subject matter of the invention can be found in the description, the drawing and the patent claims.

An illustrative example of a vehicle window is illustrated schematically simplified in the drawing and is described in more detail together with an illustrative example of a method according to the invention hereinafter.

Figure 2:
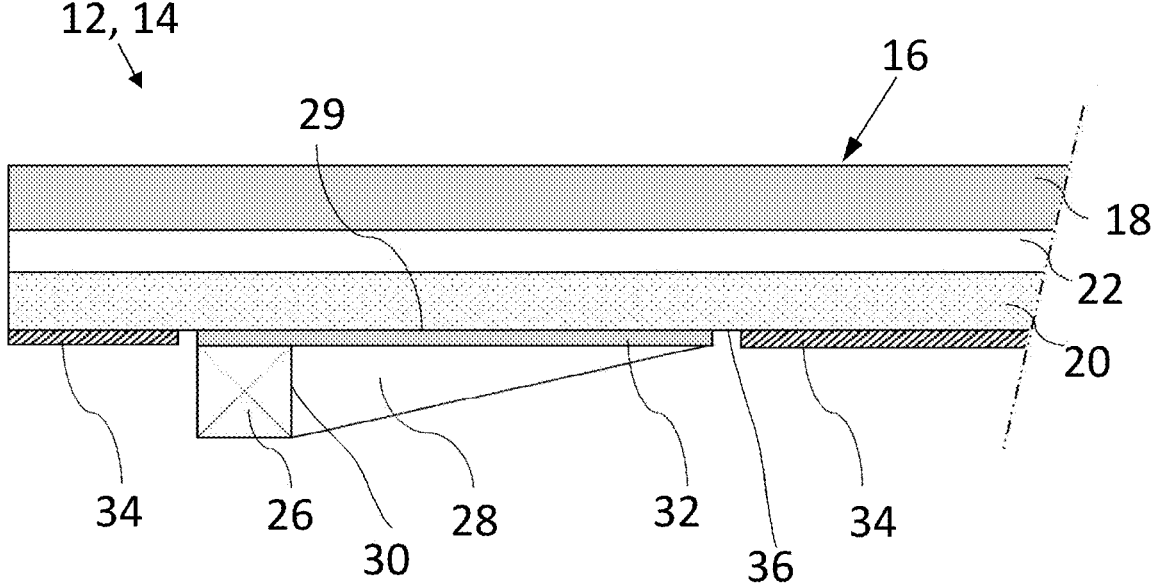

FIG. 1 shows a schematic top view of a vehicle roof having vehicle windows according to the invention; and FIG. 2 shows a schematic cut through a vehicle window of the vehicle roof according to FIG. 1 along the line II-II in FIG. 1.

FIG. 1 shows a vehicle roof 10 of a motor vehicle (not shown). Vehicle roof 10 is a panoramic roof which has a displaceable lid element 12 and a fixed roof element 14, welches is rigidly or immovably disposed relative to the vehicle body. Lid element 12, which is part of a roof opening system, and fixed roof element 14 each comprise one glass element, which constitutes a vehicle window and is provided with an ambient light functionality.

The basic structure of the vehicle windows of lid element 12 and fixed roof element 14 is the same and illustrated in more detail by means of FIG. 2. The vehicle windows of lid element 12 and fixed roof element 14 each comprise one window body arrangement 16 constituting a laminated shatterproof glass which has an outer window body 18, which faces a vehicle environment and forms an outer face of window body arrangement 16, and which has an inner window body 20, which faces a vehicle interior and is connected to outer window body 18 via a lamination film 22.

Outer window body 18 is formed by a curved glass plate, which is formed from a tinted or clear soda lime glass, for example. Of course, it is also conceivable that outer window body 18 is made of a plastic element, for example a polycarbonate element. Inner window body 20 can also be made of by an organic glass, such as a soda lime glass or a polymer, for example a polycarbonate. Outer window body 18 and inner window body 20 each have a thickness of approximately 2.1 mm.

On the inner face, window body arrangement 16 is provided with a lighting unit 24 on either side of a vertical longitudinal center roof plane, the ambient light functionality be realizable by means of said lighting unit 24. Each lighting unit 24 extends strip-like in the longitudinal direction of the vehicle and comprises an LED strip 26, which is connected to several light input elements 28 which are disposed in the longitudinal direction of the vehicle and which are wedge-shaped and which guide light, which is coupled in by LED strip 26 constituting a light source via a light input surface 30, into the light-conducting layer formed by inner window body 20 in the manner of a prism.

Light input elements 28 are fixed directly to an inner face 29 of inner window body 20 via an adhesive layer 32. LED strip 26, which abuts against light input surfaces 30 of light input elements 28, is also attached to inner face 29 of inner window body 20 via adhesive layer 32.

On inner face 29 of inner window body 20 constituting the light-conducting layer, a thermal coating 34 is formed, which constitutes a vapor deposit coating of window body arrangement 16 and comprises a metal oxide compound, an ITO compound, an FTO compound, a graphene compound and/or silver or a silver compound. In the area of each light input element 28, thermal coating 34 is provided with a recess 36, which approximately corresponds to the outline of respective light input element 28 and the respective section of LED strip 26, so that light input elements 28 and LED strip 26 are directly connected to inner window body 20 via adhesive layer 32.

When LED strips 26 are activated by means of control electronics of lighting units 24, the light emitted by LED strips 26 is coupled into light input elements 28 via light input surfaces 30 and, after a possible internal reflection within light input elements 28, is coupled into inner window body 20. By means of internal reflection on the interfaces of inner window body 20, the coupled light can propagate within it. The lights can be decoupled from inner window body 20 in the direction of the vehicle interior by means of control elements, which inner window body 20 has. A print or other structure, which scatters the light in the direction of the vehicle interior, can also be disposed on the upper side of inner window body 20. Because inner window body 20 is formed as a light-conducting layer, it forms an illuminated area in the activated state of LED strips 26.

The production of the vehicle window described above takes place in the manner described below.

Initially, window body arrangement 16 made of outer window body 18, inner window body 20 and lamination film 22 disposed between these two is provided. Subsequently, inner face 29 of inner window body 20 is provided with a sacrificial layer made of a water-soluble paste in the areas in which light input elements 28 and LED strips 26 are to be disposed. Subsequently, thermal coating 34 is applied to inner face 29 of inner window body 20 according to a chemical vapor deposit method. After the vapor deposit process, the sacrificial layers are removed from the water-soluble paste and the resulting recesses 36 undergo further cleaning, if necessary. Subsequently, light input elements 28, which are in particular made of plastic elements, are fixed to inner face 29 of inner window body 20 in the area of recesses

36 via adhesive layers 32. Accordingly, LED strips 26 are attached to window body arrangement 16 via adhesive layers 32. Subsequently, the RGB values of LED strips 26 are set in accordance with the optical behavior of thermal coating 34 via corresponding control electronics, so that inner window body 20 forms an illuminated area appearing in the desired color when LED strips 26 are activated.

REFERENCE SIGNS

10 vehicle roof
12 lid element
14 fixed roof element
16 window body arrangement
18 outer window body
20 inner window body
22 lamination film
24 lighting unit
26 LED strip
28 light input element
29 inner face
30 light input surface
32 adhesive layer
34 thermal coating
36 recess

The invention claimed is:

1. A vehicle window, comprising;
   a window body arrangement, which has an outer face facing a vehicle environment and an inner face facing a vehicle interior and a light-conducting layer, and
   the vehicle window comprising a lighting unit having at least one light source and at least one light input element, which is disposed on the inner face of the window body arrangement and by means of which light emitted by the light source can be coupled into the light-conducting layer,
   wherein a thermal coating is disposed on the inner face of the window body arrangement, the thermal coating comprising a thermally insulating material; and
   wherein the thermal coating is recessed at least in parts of the areas in which the light input element is connected.

2. The vehicle window according to claim 1, wherein the thermal coating is recessed at least in parts of the area of the light input element, so that at least parts of the light input element in this area are directly connected to the window body arrangement.

3. The vehicle window according to claim 1, wherein the thermal coating comprises a vapor deposit coating or a sputter coating.

4. The vehicle window according to claim 1, wherein the thermal coating comprises a multi-coat system.

5. The vehicle window according to claim 1, wherein the thermal coating comprises nanoparticles and/or nanowires.

6. The vehicle window according to claim 1, wherein the thermal coating comprises an inorganic metal oxide compound, an ITO compound, an FTO compound, a graphite compound and/or silver and/or a silver compound.

7. The vehicle window according to claim 1, wherein the window is a vehicle roof window.

8. A method for producing a vehicle window, comprising the following steps:
   providing a window body arrangement, which has an inner face and an outer face and which comprises a light-conducting layer forming the on its inner face;
   applying a thermal coating to the inner face of the window body arrangement, the thermal coating comprising a thermal insulation material;

applying at least one light input element to the inner face of the window body arrangement, which has a light input surface;

connecting a lighting unit comprising at least one light source to the window body arrangement and/or the light input element, so that light of the light source can be coupled into the light input element via the light input surface and via said light input element into the light-conducting layer; and wherein color coordinates are entered into the lighting unit depending on the optical behavior of the thermal coating.

9. A method for producing a vehicle window, comprising the following steps:

providing a window body arrangement, which has an inner face and an outer face and which comprises a light-conducting layer forming the inner face;

applying a thermal coating to the inner face of the window body arrangement, the thermal coating comprising a thermal insulation material;

applying at least one light input element to the inner face of the window body arrangement, which has a light input surface;

connecting a lighting unit comprising at least one light source to the window body arrangement and/or the light input element, so that light of the light source can be coupled into the light input element via the light input surface and via said light input element into the light-conducting layer; and wherein the thermal coating is recessed at least in parts of the areas in which the light input element is connected.

10. The method according to claim 9, wherein the recessing of the thermal coating comprises an etching chemical process.

11. The method according to claim 9, wherein the recessing of the thermal coating comprises a mechanical process.

12. The method according to claim 9, wherein the recessing of the thermal coating comprises a laser ablation process.

13. The method according to claim 9, wherein for recessing the thermal coating, a masking and/or a sacrificial layer is applied to the inner face of the window body arrangement before applying the thermal coating.

14. The method according to claim 8, wherein the thermal coating is applied according to a vapor deposit method or sputter method.

15. The method according to claim 8, wherein the thermal coating is applied as a film or a composite film.

* * * * *